March 27, 1945.  A. H. CHAMBERS  2,372,549
SPRING
Filed April 29, 1942
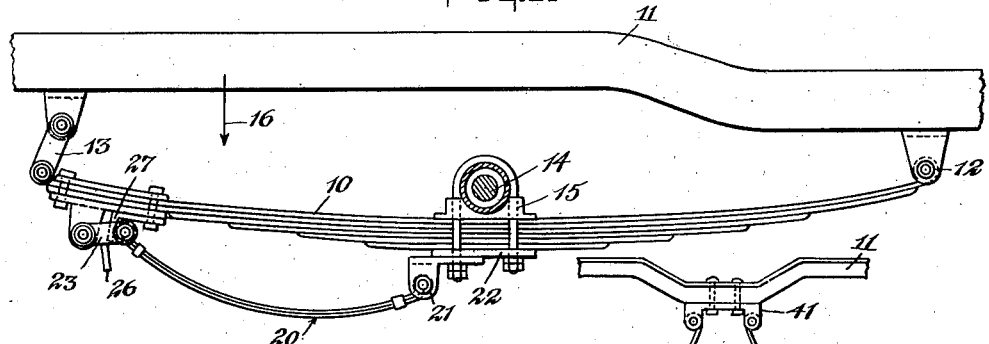
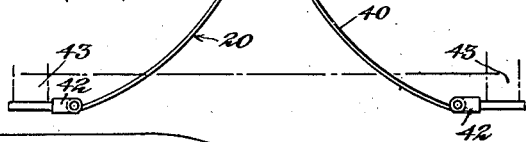
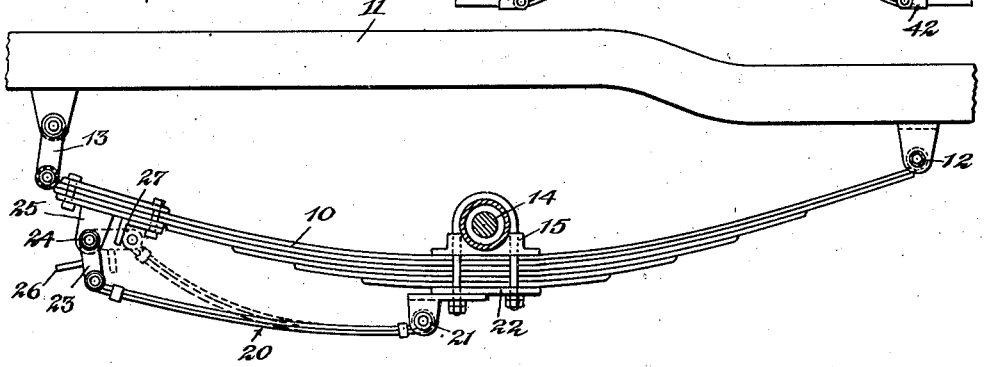
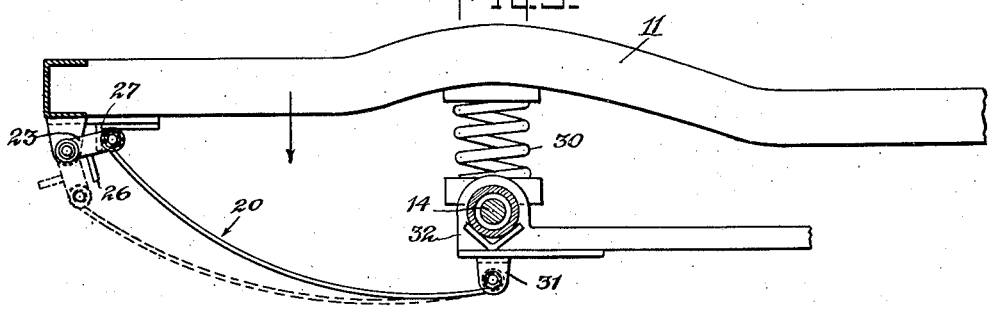
WITNESSES
INVENTOR
Arthur H. Chambers
BY
Munn, Liddy, Glaccum & Kane
ATTORNEYS Patented Mar. 27, 1945

2,372,549

UNITED STATES PATENT OFFICE 2,372,549

SPRING

Arthur H. Chambers, Plymouth, Mich.

Application April 29, 1942, Serial No. 440,935

3 Claims. (Cl. 267—36)

This invention relates to springs, and more particularly to helper springs which are adapted to supplement and aid normal vehicle springs.

While my spring is adapted to supplement the normal springs of a vehicle to assist it in carrying any excess load, it is particularly suitable and adapted for supplementing normal springs to overcome the excess load placed thereon when a trailer or other vehicle is towed by a car. As is well known, the trailer affects the riding qualities of the car due to the excess load placed upon the springs, and it is an object of this invention to overcome this difficulty and to preserve the original soft riding qualities of the car regardless of the load.

A further object is to provide means of equalizing the pressure on the normal springs of the car and preserving the life of said springs.

Other objects and purposes will become more apparent as the description proceeds.

In the accompanying drawing:

Fig. 1 is a side elevation of the frame and spring of a car showing my helper spring in the overload position;

Fig. 2 is a view similar to Fig. 1, with the helper spring in the unloaded position;

Fig. 3 is a modification showing my invention adapted to vehicles using the spiral type of spring;

Fig. 4 is a further adaptation of my invention.

In cars employing the leaf type spring the conventional spring 10 is fastened to the frame 11 by brackets 12 and shackles 13. The spring supports the axle 14 by means of the shackle 15 or by any conventional means. It will be appreciated that when an excess load is placed on the frame considerable pressure will be exercised downwardly in the direction of the arrow 16 against the spring 10 thus preventing the spring 10 from performing its normal function not only causing undue strain on the spring but resulting in a rough ride.

I provide a supplemental or helper spring 20 which may have a bracket 21 at one end thereof adapted to be fastened to the vehicle spring at 22. At the opposite end the spring 20 engages a link 23 which is in turn pivoted at 24 to a bracket 25 attached to the spring 10. The link 23 may be provided with a handle 26 to position it.

As shown in Fig. 2, in the normal operation of the vehicle the link 23 extends downwardly and allows the spring 10 to function normally. When an overload is to be placed on the vehicle, the rear end thereof may be lifted slightly and the link 23 pushed forwardly until it engages the angle 27 of the bracket 25, where it will tend to support and stiffen the spring 10. When it is desired to release the extra tension, the helper spring 20 may be returned to its original position by the handle 26.

In the form shown in Fig. 3, where a spiral spring 30 is used between the axle 14 and the frame 11, the helper spring 20 may be positioned by means of the bracket 31 to the bottom of the axle housing 32. The spring then operates in the manner outlined above to supplement and protect the spring 30.

In the form shown in Fig. 4, a pair of supplemental springs 20 and 40 are each engaged to the bracket member 41 attached to the frame 11 and are pivoted to a member 42 connected to the spring assembly 43. It will be seen that as the load is increased upon the frame 11, the arch of the springs 20 and 40 will be increased and greater tension will cause increased support.

The spring 20 may be of the leaf type and composed of any desired number of leaves. With the ordinary passenger car two single leaves should be sufficient but where heavier loads are involved a greater number of leaves may be necessary.

It will be appreciated that, while my spring has been designed and adapted particularly to supplement and aid the normal springs on a vehicle when the vehicle is used for towing a trailer or similar article, it is equally useful for any excess load that is placed upon the springs of the vehicle and may be adapted for use in connection with the front as well as rear springs.

It will also be appreciated that, while I have shown forms of my invention adapted to conventional vehicles, many different forms may and necessarily will be designed to adapt my invention to different types of spring construction.

An additional feature of my invention not heretofore particularly emphasized is that in each case the leaf springs are fastened at either end and are free to flex throughout their length. Usually springs are bolted or riveted together or clamped by means of a bracket whereby a certain rigid area is created and the flexible portion is limited. In all of my supplemental springs the leaf springs are free to flex substantially throughout the entire length and are not restricted by brackets or otherwise.

I claim:

1. A supplemental spring for vehicles comprising a leaf spring, a pair of supporting brackets, a hanger link pivoted at its upper end to one of said brackets and pivoted at its lower end to one end of said leaf spring, said leaf spring being pivoted at its other end to the other bracket, the former bracket having a seat which is adapted to receive and hold the lower end of the hanger link when said hanger link is pivoted upwardly, said leaf spring being free between its ends, said brackets being so spaced that the spring is bowed against the resistance of its own tension when the hanger link is seated.

2. In a vehicle having a conventional spiral spring which bears against the chassis at its upper end and against the axle housing at its lower end, a supplemental spring in accordance with claim 1, the bracket to which the hanger link is pivoted being affixed to the chassis, the bracket to which the leaf spring is pivoted being affixed to the axle housing.

3. In combination with a conventional leaf spring for vehicles which is pivoted at one end to the chassis, and which is connected at its other end to the chassis by means of a hanger link, and which is affixed to the axle housing at its center portion, a supplemental spring in accordance with claim 1, the bracket to which the hanger link of the supplemental spring is pivoted being affixed to the conventional leaf spring adjacent the hanger link thereof, the bracket to which the supplemental spring is pivoted being affixed to the conventional leaf spring adjacent the axle housing.

ARTHUR H. CHAMBERS.